(12) United States Patent
Talavasek et al.

(10) Patent No.: US 8,403,350 B2
(45) Date of Patent: Mar. 26, 2013

(54) SEATSTAY SUSPENSION MOUNT

(75) Inventors: Jan Talavasek, Morgan Hill, CA (US); Robb Jankura, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 449 days.

(21) Appl. No.: 12/780,093

(22) Filed: May 14, 2010

(65) Prior Publication Data

US 2011/0278817 A1    Nov. 17, 2011

(51) Int. Cl.
 *B62K 3/00* (2006.01)
(52) U.S. Cl. .............. 280/281.1; 280/124.134; 280/284; 280/283
(58) Field of Classification Search .................. 280/283, 280/281.1, 124.134, 284
See application file for complete search history.

(56) References Cited

U.S. PATENT DOCUMENTS

| | | | |
|---|---|---|---|
| 5,259,637 A | 11/1993 | Busby | |
| 5,269,552 A | 12/1993 | Yelverton | |
| 5,409,249 A | 4/1995 | Busby | |
| 5,671,936 A | 9/1997 | Turner | |
| 5,957,473 A | 9/1999 | Lawwill | |
| 6,837,507 B1 | 1/2005 | McJunkin | |
| 7,350,797 B2 | 4/2008 | Carroll | |
| 2001/0015540 A1 | 8/2001 | Lawwill et al. | |
| 2004/0061305 A1 | 4/2004 | Christini | |
| 2009/0261557 A1 | 10/2009 | Beale et al. | |
| 2009/0277732 A1 | 11/2009 | Trujillo et al. | |
| 2010/0059965 A1 | 3/2010 | Earle | |
| 2010/0225089 A1* | 9/2010 | Chamberlain | ................ 280/275 |

* cited by examiner

*Primary Examiner* — Tony H. Winner
*Assistant Examiner* — Jacob Knutson
(74) *Attorney, Agent, or Firm* — Michael Best & Friedrich LLP

(57) ABSTRACT

A bicycle that including front and rear wheels and a frameset supported by the wheels. The frameset including a main frame with a seat tube having a width, a fork that couples the main frame to the front wheel, and a seatstay assembly. The seatstay assembly including first and second seatstays positioned on opposing sides of the rear wheel and on opposing sides of the seat tube. A front end of the first seatstay is spaced from a front end of the second seatstay by a distance greater that the width of the seat tube. The frameset also including a suspension mount that is detachably secured to the front end of the first seatstay and a suspension member that is pivotally coupled to the suspension mount.

20 Claims, 6 Drawing Sheets

SEATSTAY SUSPENSION MOUNT

BACKGROUND

The present invention relates to bicycles with suspension systems. More particularly, the invention relates to rear suspension bicycles and arrangements for mounting a rear suspension on the bicycle.

Many bicycles include a shock-absorbing suspension one the front and/or rear of the bicycle. Rear suspensions commonly include a suspension member attached to the seatstays of the frame. In these arrangements, the seatstays commonly are positioned on opposing sides of the seat tube, and are secured to the suspension member located forward of the seat tube. U.S. Patent Publication No. 2004/0061305 and U.S. Pat. No. 5,269,552 disclose different types of this arrangement.

SUMMARY

The present invention provides a bicycle that includes front and rear wheels and a frameset supported by the wheels. The frameset includes a main frame that includes a seat tube having a width, a fork that couples the main frame to the front wheel, and a seatstay assembly. The seatstay assembly includes first and second seatstays positioned on opposing sides of the rear wheel and on opposing sides of the seat tube (e.g., the seat tube may be positioned at least partially between the first and second seatstays). A front end of the first seatstay is spaced from a front end of the second seatstay by a distance greater that the width of the seat tube. The frameset also includes a suspension mount that is detachably secured to the front end of the first seatstay and a suspension member that is pivotally coupled to the suspension mount.

In one embodiment, the suspension mount includes a first suspension mount, and the seatstay assembly includes a second suspension mount secured to the front end of the second seatstay. Preferably, the first and second suspension mounts are spaced from each other by a distance that is less than the width of the seat tube. The front end of the second seatstay may be closer to the suspension member than the front end of the first seatstay. For example, a length of the first suspension mount may be greater than a length of the second suspension mount. In addition, a gap between the front end of the first seatstay and the second suspension mount may be greater than the width of the seat tube.

Furthermore, an adapter may be positioned at least partially in the first seatstay, and the suspension mount may be detachably secured to the adapter. For example, the adapter may include a threaded opening, and the seatstay assembly may further include a fastener inserted through a hole in the suspension mount and threaded into the threaded opening. Preferably, the adapter defines a recess having a non-circular (e.g., oval) cross section, and the suspension mount includes a non-circular (e.g., oval) portion positioned in the recess.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
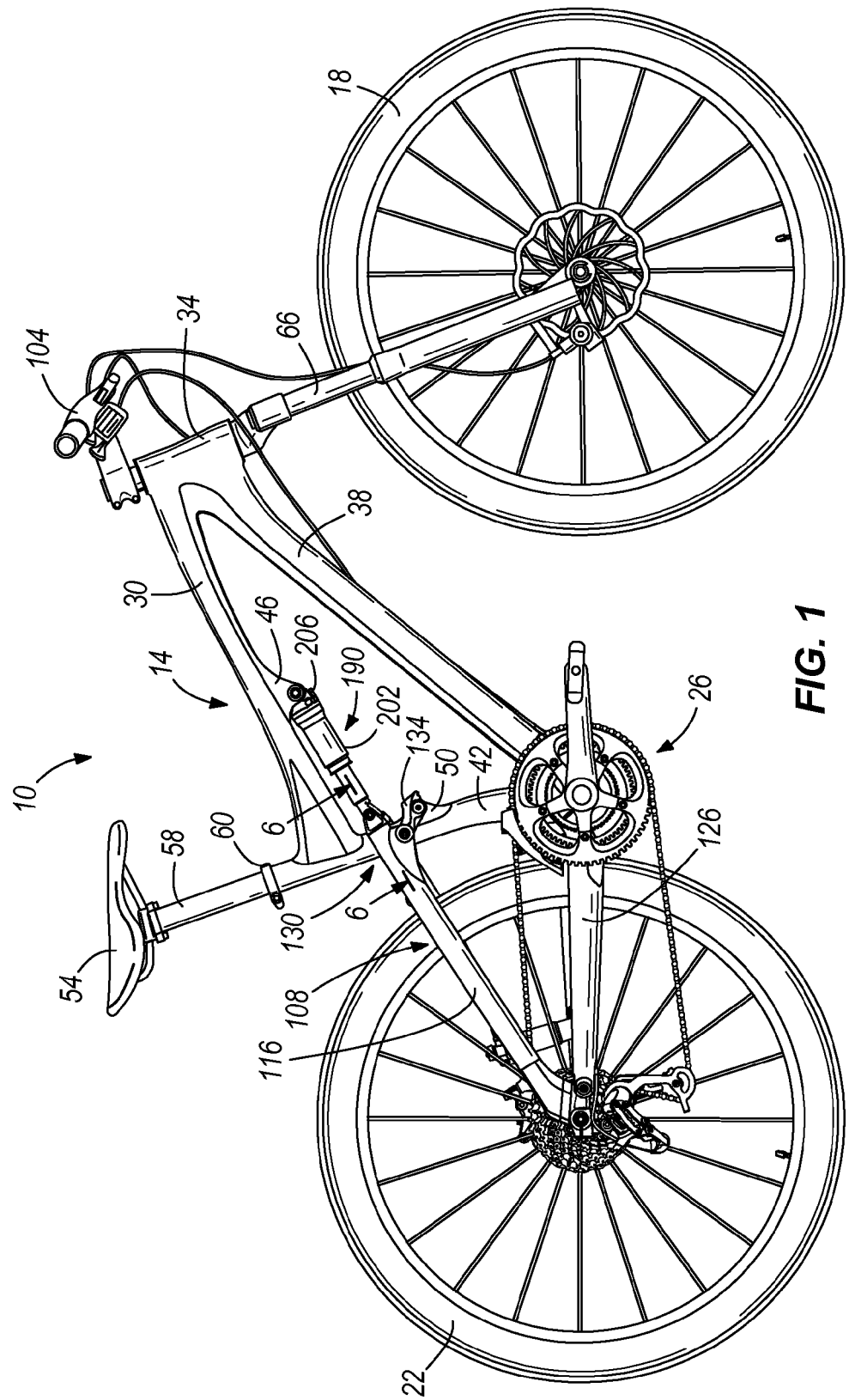
FIG. 1 is a right side view of a bicycle according to one embodiment of the invention.

FIG. 1 shows a bicycle 10 that includes a frameset 14, a front wheel 18, a rear wheel 22, and a drive train 26. The frameset 14 includes a main frame with a top tube 30, a head tube 34, a down tube 38, and a seat tube 42. A top tube mount 46 is disposed on the underside of the top tube 30 and a seat tube mount 50 is disposed on the front side of the seat tube 42. A saddle 54 including a seat post 58 is mounted to the frameset 14 with a clamp 60.

The frameset 14 includes a front fork 66 rotatably received within the head tube 34 and rotatably connected to the front wheel 18. A handle bar assembly 104 is clamped to the front fork 66 and may be manipulated by the user to steer the bicycle 10, apply brakes, adjust the drive train 26, and perform other duties, as desired.

The frameset 14 further includes a rear triangle 108 rotatably connected to the rear wheel 22. The rear triangle 108 includes a seatstay assembly with a left seatstay 112 (see FIG. 2), a right seatstay 116, a seatstay bridge 118 (see FIG. 2) that connects the left seatstay 112 and the right seatstay 116, and a suspension mounting portion 130. A left chain stay (not visible) and a right chain stay 126 are coupled to the seatstay assembly. The left seatstay 112 and the right seatstay 116 include hollow tubular members.

Figure 2:
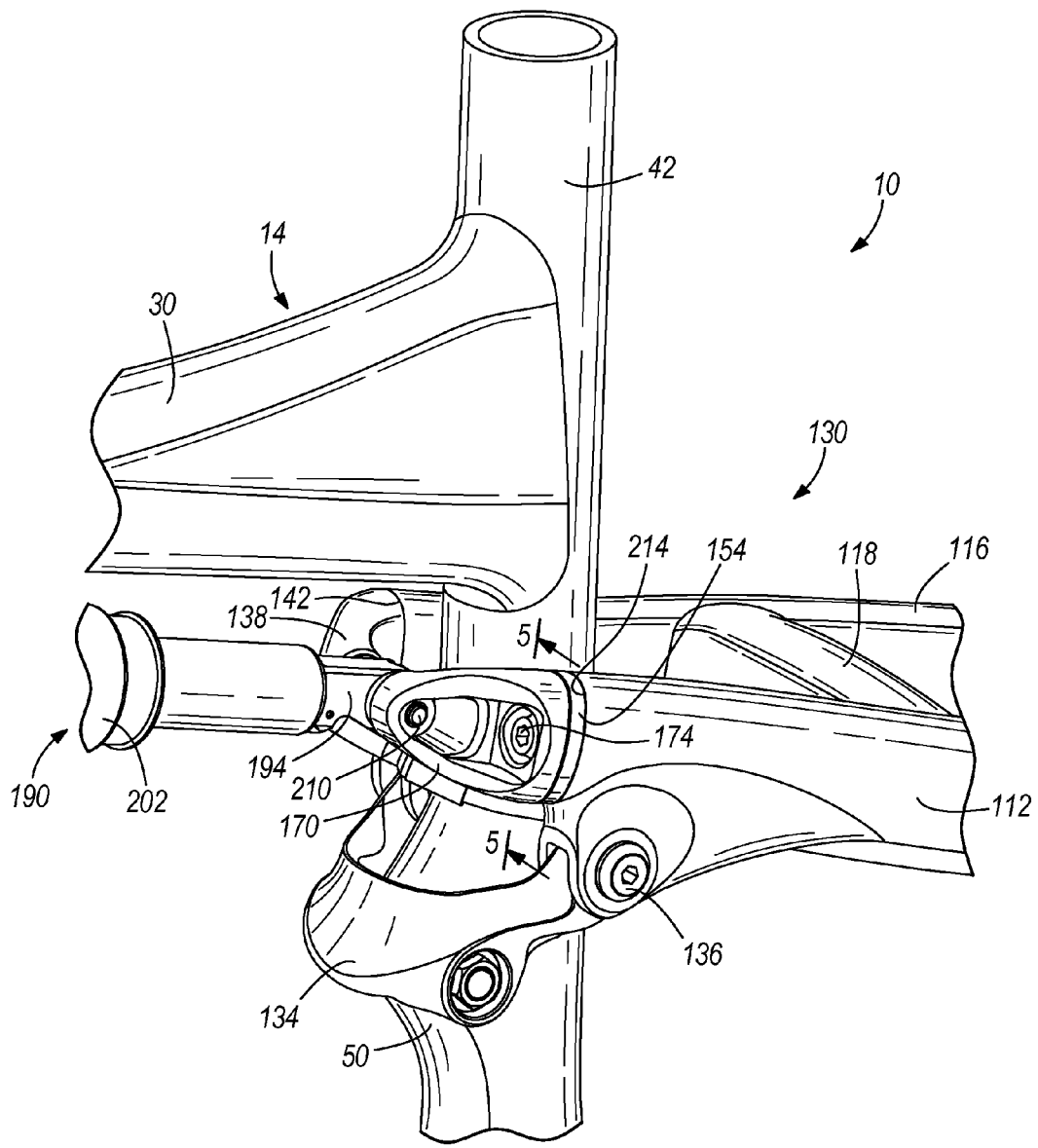
FIG. 2 is a detailed perspective view of a seatstay suspension mount of the bicycle of FIG. 1.
Figure 3:
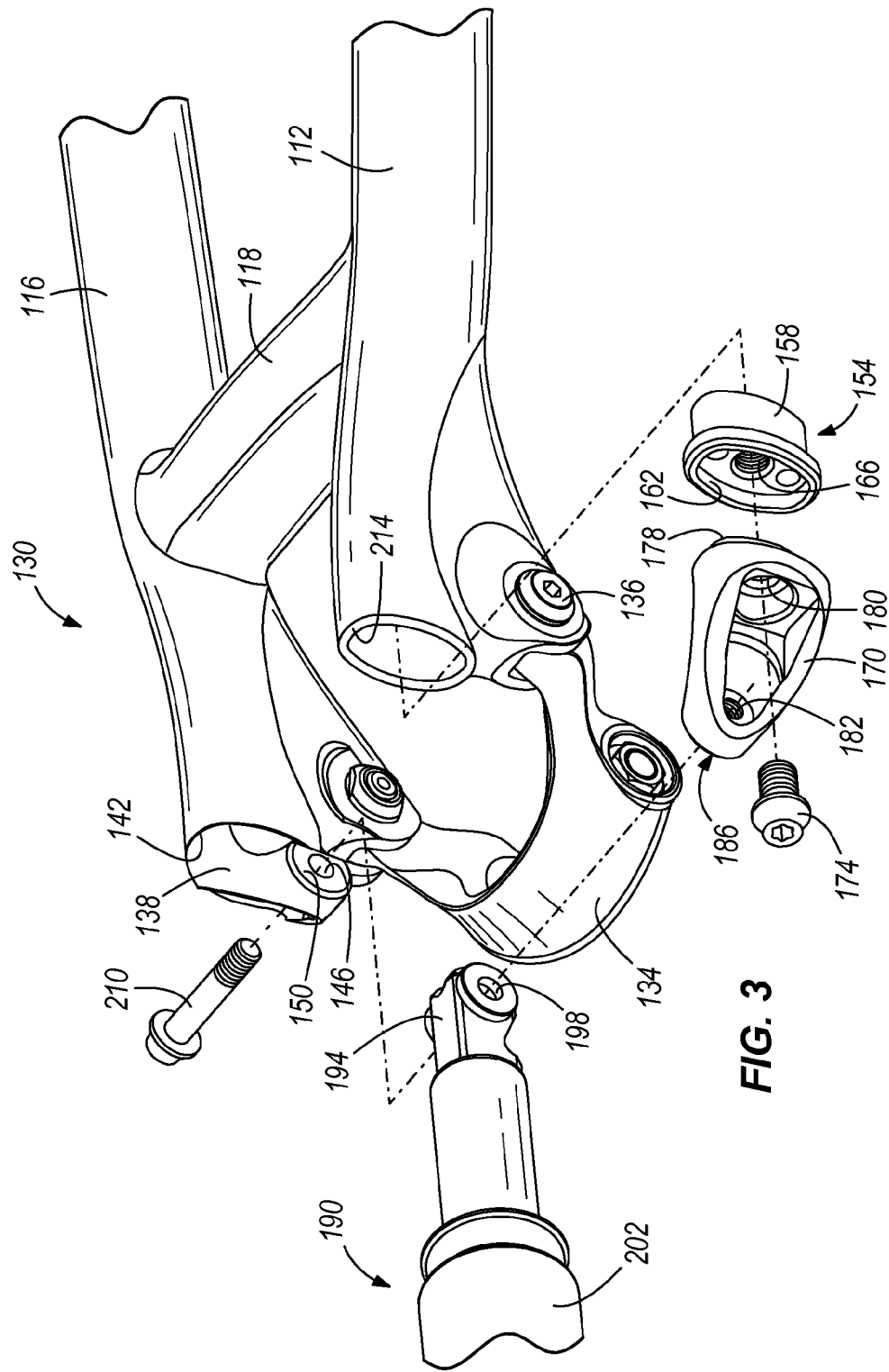
FIG. 3 is an exploded view of the seatstay suspension mount of FIG. 2.

FIGS. 2 and 3 show the suspension mounting portion 130 in more detail. A seatstay link 134 pivotally connects the seatstay assembly to the seat tube mount 50 such that the rear triangle 108 can pivot relative to the seat tube 42. The illustrated seatstay link 134 is attached to the seatstay assembly with fasteners 136.

A right suspension mount 138 is secured to a right front end 142 of the right seatstay 116. In the illustrated construction, the right suspension mount 138 is secured to the right seatstay 116 by adhesive. In other constructions, the right suspension mount 138 may be formed as a single piece with the right seatstay 116 or secured thereto in a different way such as welding or brazing, as desired. The right suspension mount 138 includes an aperture 146 and a right shock surface 150.

An adapter 154 is secured to the left seatstay 112. The adapter 154 has a portion of reduced size 158 that is received within the left seatstay 112, and the illustrated adapter 154 is secured to the left seatstay 112 by adhesive. In other constructions, the adapter 154 may be formed as a single piece with the left seatstay 112 or secured thereto in a different way such as welding, brazing, or fastening, as desired. The adapter 154 has a non-circular cross section and includes a recess 162 having a non-circular shape and a threaded aperture 166. The illustrated recess has an oval cross section, though other shapes are contemplated.

Figure 4:
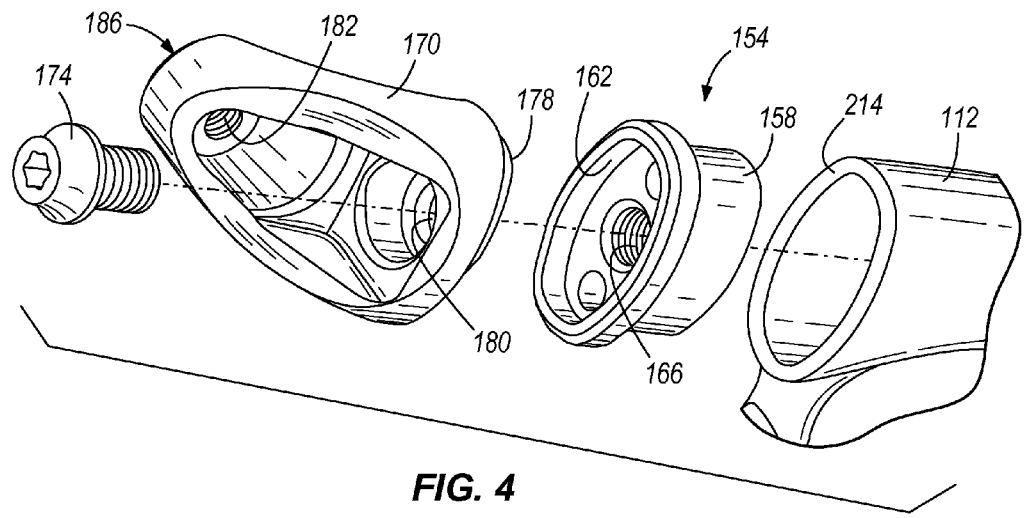
FIG. 4 is a more detailed exploded view of the left side of the seatstay suspension mount of FIG. 3.
Figure 5:
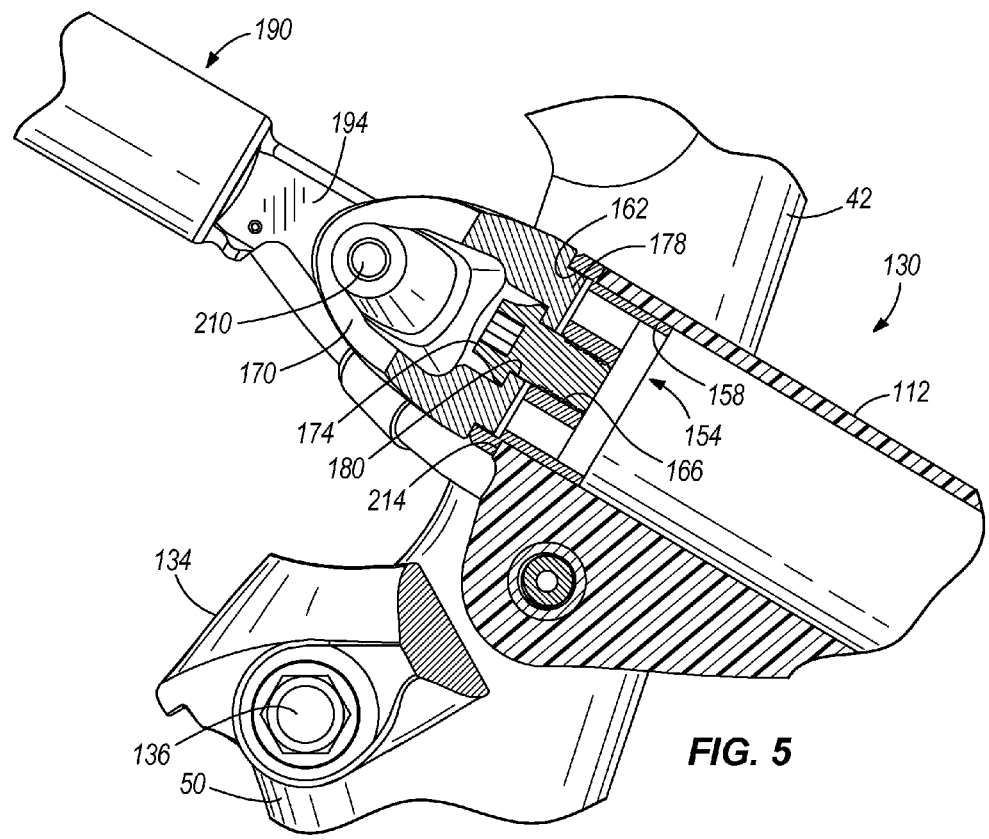
FIG. 5 is a section view of the bicycle taken along line 5-5 of FIG. 2.

A left suspension mount 170 is detachably secured to the adapter 154 with a fastener 174. The left suspension mount 170 includes a non-circular portion or projection 178 that is sized to be received in the recess 162 of the adapter 154, an aperture 180 through the projection 178, a threaded aperture 182, and a left shock surface 186. The illustrated projection 178 has an oval shape, though other shapes matching the recess 162 could be used. FIGS. 4 and 5 show the left suspension mount 170 in more detail.

With reference to FIG. 3, a suspension member 190 or shock includes a first end 194 with an aperture 198, a spring/damper system 202, and a second end 206 mounted to the top tube mount 46 (see FIG. 1). The first end 194 of the suspension member 190 is mounted between the right suspension mount 138 and the left suspension mount 170. The suspension member 190 is pivotally coupled to the suspension mounting portion 130 with a fastener in the form of a pivot shaft 210 or lock bolt. When installed (see FIG. 6), the pivot shaft 210 is inserted through the aperture 146 in the right suspension mount 138, the aperture 198 in the first end 194 of the suspension member 190, and threaded into the threaded aperture 182 of the left suspension mount 170. It should be appreciated that, in other embodiments, the suspension member could be indirectly coupled to the suspension mounts, such as through a linkage or other mechanism.

Figure 6:
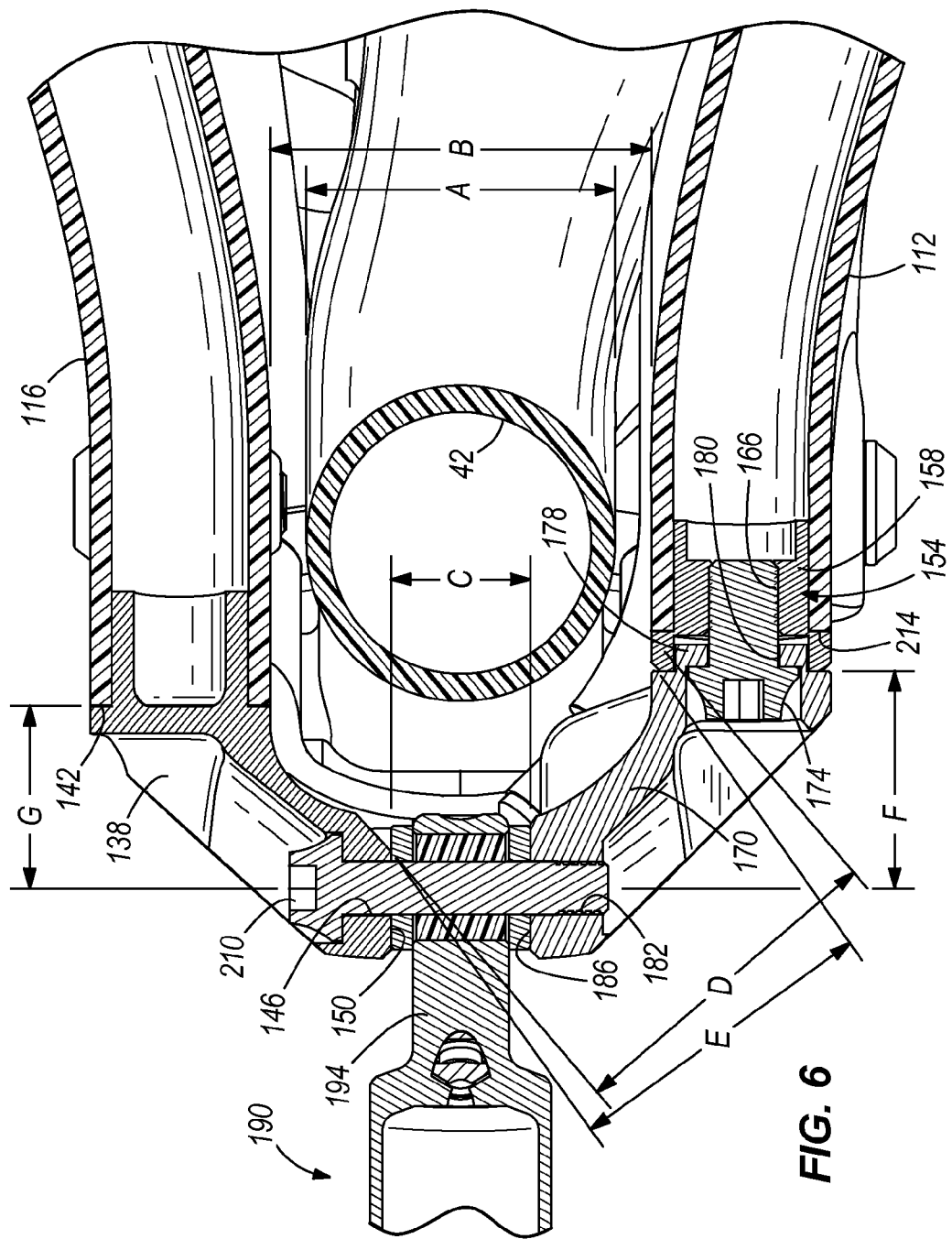
FIG. 6 is a section view of the bicycle taken along line 6-6 of FIG. 1.

Turning to FIG. 6, details of the arrangement of the suspension mounting portion 130 will be discussed. The seat tube 42 defines a seat tube width A at the location where the suspension mounting portion 130 is positioned. The right seatstay 116 includes the right front end 142 and the left seatstay 112 defines a left front end 214. The illustrated right seatstay 116 and the left seatstay 112 are continuous from dropouts connected to the rear wheel 22 to the right front end 142 and the left front end 214, respectively, and do not include any intermediate links. The innermost points of the right front end 142 and the left front end 214 define a distance B therebetween that is larger than the seat tube width A. That is to say, the right seatstay 116 is spaced from the left seatstay 112 by a distance B larger than the seat tube width A. When the suspension member 190 is installed, a space C between the right shock surface 150 and the left shock surface 186 is less than the seat tube width A. Additionally, a minimum distance D between the right shock surface 150 and the left front end 214 of the left seatstay 112 is larger than the seat tube width A. Furthermore, a minimum distance E between the right shock surface 150 and the adapter 154 is larger than the seat tube width A.

The left suspension mount 170 defines a left mount length F from the center line of the threaded aperture 182 to the end of the adapter 154, and the right suspension mount 138 defines a right mount length G from the center of the aperture 146 to the right front end 142 of the right seatstay 116. The left mount length F is greater than the right mount length G.

When the suspension member 190 is installed, the right front end 142 of the right seatstay 116 is closer to the suspension member 190 that the left front end 214 of the left seatstay 112. Furthermore, the right front end 142 is closer to the suspension member 190 than the adapter 154.

To install the rear triangle 108 onto the main frame of the bicycle 10, an assembler first starts with the left suspension mount 170 removed. The suspension mounting portion 130 is then slid over the seat tube 42 and into position such that at least a portion of the seat tube 42 is positioned between the left seatstay 112 and the right seatstay 116. Once aligned, the left and right chainstays are connected to the main frame, the seatstay link 134 is coupled to the seat tube mount 50, and the left suspension mount 170 is inserted into the adapter 154. The fastener 174 is then threaded into the threaded hole 166 of the adapter 154 to secure the left suspension mount 170 to the left seatstay 112. The suspension member 190 is then positioned between the right shock surface 150 and the left shock surface 186. The pivot shaft 210 is then inserted and threaded into the threaded aperture 182 in the left suspension mount 170. Once fully threaded, the suspension member 190 is pivotally coupled to the suspension mounting portion 130.

Figure 7:
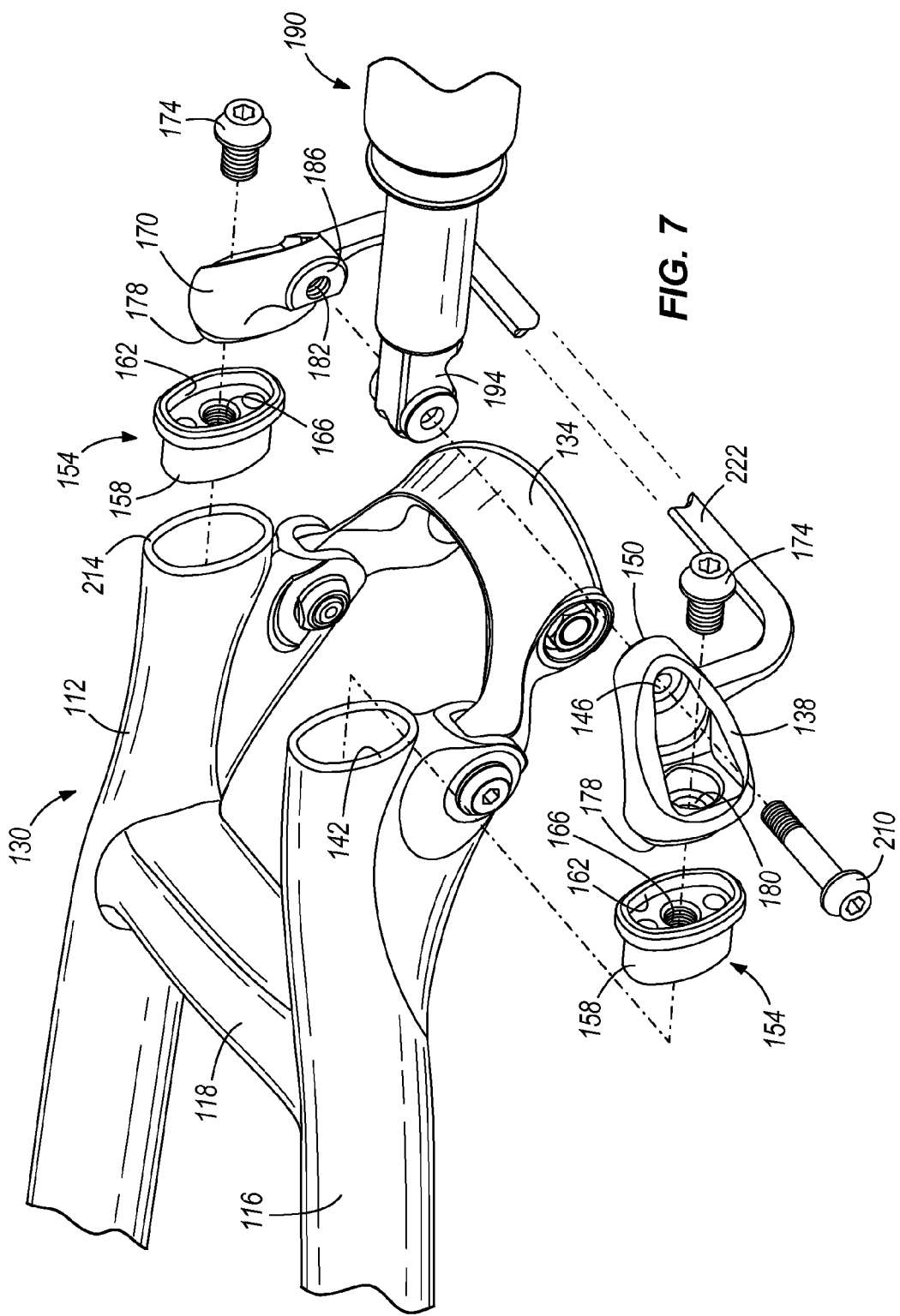
FIG. 7 is an exploded view of an alternate seatstay suspension mount.

FIG. 7 shows an alternate construction wherein the left suspension mount 170 and the right suspension mount 138 are formed as a single piece and are removable from the suspension mounting assembly. Such a left suspension mount 170 and right suspension mount 138 are connected by a web 222 and the component may be formed via forging, welding, molding, brazing, or any other technique. To secure the component to the right and left seatstays 112, 114, two adapters 154 and two fasteners 174 are used, as shown.

Various features and advantages of the invention are set forth in the following claims.

The invention claimed is:

1. A bicycle comprising:
    front and rear wheels; and
    a frameset supported by the wheels, the frameset comprising:
        a main frame including a seat tube having a width;
        a fork coupling the main frame to the front wheel,
        a seatstay assembly including:
            first and second seatstays positioned on opposing sides of the rear wheel and on opposing sides of the seat tube, wherein a front end of the first seatstay is spaced from a front end of the second seatstay by a distance greater that the width of the seat tube; and
            a suspension mount detachably secured to the front end of the first seatstay; and
        a suspension member pivotally coupled to the suspension mount.

2. A bicycle as claimed in claim 1, wherein the suspension mount comprises a first suspension mount, and wherein the seatstay assembly further includes a second suspension mount secured to the front end of the second seatstay.

3. A bicycle as claimed in claim 2, wherein the first and second suspension mounts are spaced from each other by a distance that is less than the width of the seat tube.

4. A bicycle as claimed in claim 2, further comprising a pivot shaft coupling the first and second suspension mounts to the suspension member.

5. A bicycle as claimed in claim 2, wherein a gap between the front end of the first seatstay and the second suspension mount is greater than the width of the seat tube.

6. A bicycle as claimed in claim 1, wherein the suspension mount comprises a first suspension mount, wherein the seatstay assembly further includes a second suspension mount, and wherein the first and second suspension mounts are formed as a single piece.

7. A bicycle as claimed in claim 1, wherein the first seatstay comprises a hollow tubular member.

8. A bicycle as claimed in claim 7, wherein the seatstay assembly further comprises an adapter positioned at least partially in the hollow tubular member, and wherein the suspension mount is detachably secured to the adapter.

9. A bicycle as claimed in claim 8, wherein the adapter comprises a threaded opening, and wherein the seatstay assembly further comprises a fastener inserted through a hole in the suspension mount and threaded into the threaded opening.

10. A bicycle as claimed in claim 8, wherein the adapter defines a recess having a non-circular cross section, and wherein the suspension mount includes a non-circular portion positioned in the recess.

11. A bicycle as claimed in claim 10, wherein the recess defines an oval cross section, and wherein the non-circular portion comprises an oval cross section that fits into the recess.

12. A bicycle comprising:
front and rear wheels; and
a frameset supported by the wheels, the frameset comprising:
　a main frame including a seat tube having a width;
　a fork coupling the main frame to the front wheel,
　a seatstay assembly including:
　　first and second seatstays positioned on opposing sides of the rear wheel, wherein a front end of the first seatstay is spaced from a front end of the second seatstay by a distance greater that the width of the seat tube, and wherein the seat tube is positioned at least partially between the first and second seatstays; and
　　a suspension mount detachably secured to the front end of the first seatstay; and
　a suspension member pivotally coupled to the suspension mount.

13. A bicycle as claimed in claim 12, wherein the suspension mount comprises a first suspension mount, and wherein the seatstay assembly further includes a second suspension mount secured to the front end of the second seatstay.

14. A bicycle as claimed in claim 13, wherein the first and second suspension mounts are spaced from each other by a distance that is less than the width of the seat tube.

15. A bicycle as claimed in claim 12, wherein the suspension mount comprises a first suspension mount, wherein the seatstay assembly further includes a second suspension mount, and wherein the first and second suspension mounts are formed as a single piece.

16. A bicycle as claimed in claim 12, wherein the first seatstay comprises a hollow tubular member.

17. A bicycle as claimed in claim 16, wherein the seatstay assembly further comprises an adapter positioned at least partially in the hollow tubular member, and wherein the suspension mount is detachably secured to the adapter.

18. A bicycle as claimed in claim 17, wherein the adapter comprises a threaded opening, and wherein the seatstay assembly further comprises a fastener inserted through a hole in the suspension mount and threaded into the threaded opening.

19. A bicycle comprising:
front and rear wheels; and
a frameset supported by the wheels, the frameset comprising:
　a main frame including a seat tube having a width;
　a fork coupling the main frame to the front wheel,
　a seatstay assembly including:
　　first and second seatstays positioned on opposing sides of the rear wheel and on opposing sides of the seat tube, wherein a front end of the first seatstay is spaced from a front end of the second seatstay by a distance greater that the width of the seat tube;
　　a first suspension mount detachably secured to the front end of the first seatstay; and
　　a second suspension mount secured to the front end of the second seatstay, the first and second suspension mounts spaced from each other by a distance that is less than the width of the seat tube; and
　a suspension member pivotally coupled to the suspension mount,
wherein the front end of the second seatstay is closer to the suspension member than the front end of the first seatstay.

20. A bicycle as claimed in claim 19, wherein a length of the first suspension mount is greater than a length of the second suspension mount.

* * * * *

UNITED STATES PATENT AND TRADEMARK OFFICE
CERTIFICATE OF CORRECTION

| | | |
|---|---|---|
| PATENT NO. | : 8,403,350 B2 | Page 1 of 1 |
| APPLICATION NO. | : 12/780093 | |
| DATED | : March 26, 2013 | |
| INVENTOR(S) | : Jan Talavasek and Robb Jankura | |

It is certified that error appears in the above-identified patent and that said Letters Patent is hereby corrected as shown below:

On the Title page, under the ABSTRACT, Item (57), line 9: Replace the word [that] with --than--

In the Claims

Column 4, line 34 of claim 1: Replace the word [that] with --than--

Signed and Sealed this
Twenty-eighth Day of May, 2013

Teresa Stanek Rea
*Acting Director of the United States Patent and Trademark Office*